United States Patent [19]

Tsutsumi et al.

[11] Patent Number: 5,229,222

[45] Date of Patent: Jul. 20, 1993

[54] FUEL CELL SYSTEM

[75] Inventors: Masaru Tsutsumi, Hyogo; Nobuyoshi Nishizawa, Neyagawa; Tsukasa Itoh, Sumoto; Takaaki Matsubayashi, Hirakata; Takahiro Yonesaki, Tokorozawa; Koichi Satoh, Kobe; Akio Furukawa, Osaka; Ikuo Yonezu, Hirakata; Shin Fujitani, Hirakata; Kenji Nasako, Hirakata; Toshihiko Saito, Kyoto, all of Japan

[73] Assignee: Sanyo Electric Co., Ltd., Osaka, Japan

[21] Appl. No.: 790,474

[22] Filed: Nov. 12, 1991

[30] Foreign Application Priority Data

Nov. 14, 1990 [JP] Japan .................. 2-309198
Nov. 30, 1990 [JP] Japan .................. 2-339944
Aug. 20, 1991 [JP] Japan .................. 3-207792

[51] Int. Cl.⁵ ............................................ H01M 8/18
[52] U.S. Cl. ............................ 429/19; 429/25; 429/57; 429/58
[58] Field of Search ........................ 429/19, 25, 57, 58

[56] References Cited

U.S. PATENT DOCUMENTS

| 3,278,334 | 10/1966 | Urry | 429/58 |
| 4,216,274 | 8/1980 | Bruning et al. | 429/57 |
| 4,275,127 | 6/1981 | Ritterman et al. | 429/57 |

FOREIGN PATENT DOCUMENTS

| 27528 | 3/1977 | Japan | 429/57 |
| 70339 | 6/1978 | Japan | 429/57 |
| 143940 | 12/1978 | Japan | 429/58 |
| 11477 | 1/1982 | Japan | 429/58 |
| 2-170369 | 7/1990 | Japan | . |
| 7105919 | 11/1971 | Netherlands | 429/57 |

Primary Examiner—Wayne Langel
Attorney, Agent, or Firm—Morrison Law Firm

[57] ABSTRACT

A fuel cell system for directly converting chemical energy of a fuel into electric energy electrochemically. A fuel cell has a cathode and an anode. A main hydrogen absorbing alloy supplies a hydrogen gas to the anode of the fuel cell during steady-state operation of the system. An auxiliary hydrogen absorbing alloy originally having a higher hydrogen gas absorbing/desorbing equilibrium pressure than the main hydrogen absorbing alloy at an equal temperature supplies a hydrogen gas to the anode until the equilibrium pressure of the main hydrogen absorbing alloy, which is supplied an exhaust gas from the fuel cell is equal to a hydrogen gas absorbing/desorbing equilibrium pressure of the auxiliary hydrogen absorbing alloy, the auxiliary hydrogen absorbing alloy receiving the hydrogen gas from the main hydrogen absorbing alloy during steady-state operation.

5 Claims, 13 Drawing Sheets

FUEL CELL SYSTEM

BACKGROUND OF THE INVENTION (1) Field of the Invention

This invention relates to a fuel cell system, especially to a fuel cell system which is started smoothly.

(2) Description of the Prior Art

In a conventional fuel cell system, a hydrogen gas as a fuel is supplied from a high-pressure hydrogen gas cylinder to a fuel cell through a hydrogen gas supply path equipped with a pressure reducing valve for reducing a pressure of the hydrogen gas to a specified level.

The above fuel cell system has the problem of low operability, which is caused by the following reasons: (a) the hydrogen gas cylinder, which can accommodate only a small amount of hydrogen gas in a unit volume thereof, has to be replaced frequently; and (b) the cylinders are hard to handle.

It has been proposed that alcohol or naphtha, which is used as the fuel, is supplied through a fuel supply path equipped with a fuel reforming apparatus for turning the alcohol or naphtha into a hydrogen gas. Such a method increases a volume density of the fuel but requires a huge and expensive system due to the large-scale fuel reforming apparatus.

Also it has been proposed to supplying a hydrogen gas from a tank accommodating a hydrogen absorbing alloy, which is provided instead of the high-pressure hydrogen gas cylinder. Since the hydrogen absorbing alloy absorbs heat when desorbing the hydrogen gas, a hydrogen gas absorbing/desorbing equilibrium pressure (will be referred to simply as equilibrium pressure) is lowered, thereby causing an amount of desorbed hydrogen gas to fluctuate unless heat is supplied from the outside.

Japanese Patent Publication No. 56-26113 and U.S. Pat. No. 4,826,741 have disclosed supplying an exhaust heat from the fuel cell to the hydrogen absorbing alloy in order to prevent the decline of the equilibrium pressure. This system has no problems when the system is in a steady-state operation. When the temperature of the exhaust gas is low, such as during the operation starting time, the supplied heat is not enough to raise the equilibrium pressure, thereby preventing a smooth supply of the hydrogen gas.

The following two systems have been proposed in order to solve the above problems.

(A) Using a hydrogen absorbing alloy having a high equilibrium pressure.

(B) Providing an inner container and an outer container as disclosed in Japanese Patent Publication No. 62-49703. A hydrogen absorbing alloy is accommodated in one of the containers and a metal hydride is accommodated in the other. A hydrogen gas is supplied to one of the containers, whereby the container absorbs the hydrogen gas. Heat generated by this absorption is used to dissociate a hydrogen gas in the other container. The dissociated hydrogen gas is supplied to the fuel cell.

The above two systems also have problems.

(Problem of A) As an ambient cell system is increased, a temperature of the hydrogen absorbing alloy is also increased, thereby drastically raising the pressure of the hydrogen gas. Since this phenomenon requires a high pressure tank for accommodating the hydrogen absorbing alloy, the manufacturing cost of the system is high.

(Problem of B) The supply of the hydrogen gas to one of the containers requires an external source of the hydrogen gas. Such a construction is not desirable for a compact, portable system.

OBJECTS AND SUMMARY OF THE INVENTION

Accordingly, this invention has an object of offering a fuel cell system for supplying a hydrogen gas smoothly to a fuel cell even at an operation starting time, when an exhaust heat has a low temperature.

Another object of this invention is to offer a fuel cell system which can be manufactured at a low cost.

Still another object of this invention is to offer a fuel cell system for starting an operation of the system without an external hydrogen gas source.

Still another object of this invention is to offer a fuel cell system for improving safety.

Still another object of this invention is to offer a fuel cell system, in which a pressure container accommodating a main hydrogen absorbing alloy can be compact.

Still another object of this invention is to offer a fuel cell system for generating power smoothly even during the replacement of the hydrogen absorbing alloys.

Still another object of this invention is to offer a fuel cell system which informs you of an appropriate time for supplying the hydrogen gas.

The above objects are fulfilled by a fuel cell system for directly converting a chemical energy of a fuel into an electric energy electrochemically, the system comprising a fuel cell having a cathode and an anode; a main hydrogen absorbing alloy for supplying a hydrogen gas to the anode of the fuel cell during a steady-state operation of the system; and an auxiliary hydrogen absorbing alloy originally having a higher hydrogen gas absorbing/desorbing equilibrium pressure than the main hydrogen absorbing alloy at an equal temperature, whereby supplying a hydrogen gas to the anode until the equilibrium pressure of the main hydrogen absorbing alloy, which is supplied exhaust heat from the fuel cell becomes equal to a hydrogen gas absorbing/desorbing equilibrium pressure of the auxiliary hydrogen absorbing alloy, the auxiliary hydrogen absorbing alloy receiving the hydrogen gas from the main hydrogen absorbing alloy during steady-state operation.

The fuel cell and the main hydrogen absorbing alloy may be connected to each other through a hydrogen gas supply path, which is equipped with the auxiliary hydrogen absorbing alloy. Such a system will be referred as System [L].

The fuel cell and the main hydrogen absorbing alloy may be connected to each other through a hydrogen gas supply path, which has a branch path equipped with the auxiliary hydrogen absorbing alloy. Such a system will be referred to as System [M].

At the start of operation of the fuel cell system having the above construction, since the main and the auxiliary hydrogen absorbing alloys have an equal temperature and also are filled with the hydrogen gas, the hydrogen gas is supplied to the fuel cell from the auxiliary hydrogen absorbing alloy which has the higher equilibrium pressure. The decline in the hydrogen gas desorbing pressure is thus prevented even at the start of operation of the system, and therefore the hydrogen gas can be supplied to the fuel cell smoothly.

When the temperature of the supplied exhaust heat is raised to make the equilibrium pressure of the main hydrogen absorbing alloy higher than that of the auxiliary hydrogen absorbing alloy (the auxiliary hydrogen absorbing alloy is not supplied the exhaust heat), the hydrogen gas is supplied from the main hydrogen absorbing alloy to the fuel cell, thereby starting the steady-state operation. Since the main hydrogen absorbing alloy sends a portion of the hydrogen gas to the auxiliary hydrogen absorbing alloy at this time, the auxiliary hydrogen absorbing alloy is again filled with the hydrogen gas. Even at the following operation start or during the replacement of the main hydrogen absorbing alloy, the hydrogen gas is supplied smoothly from the auxiliary hydrogen absorbing alloy to the fuel cell, so as to maintain steady power generation.

Both at the operation start and during steady-state operation, there is no need for heightening the equilibrium pressure of the main hydrogen absorbing alloy. This means the pressure container for accommodating the main hydrogen absorbing alloy can be compact and thus low-priced.

In system [M] also, the auxiliary hydrogen absorbing main hydrogen absorbing alloy may be connected to each other through a hydrogen gas circulating path equipped with a back pressure valve, which is operated at no lower than a specified pressure.

In System [M] also, the auxiliary hydrogen absorbing alloy and the main hydrogen absorbing alloy may be connected to each other through a hydrogen gas circulating path equipped with a back pressure valve, which is operated at no lower than a specified pressure.

Such a construction realizes a safer operation, a higher power generating efficiency and a lower manufacturing cost. When the ambient temperature is increased to cause an excessive rise in the pressure of the auxiliary hydrogen absorbing alloy, the back pressure valve is opened to send the hydrogen gas back to the main hydrogen absorbing alloy. Accordingly, the pressure of the fuel cell system never gets above the specified value even with out desorption of the hydrogen gas. Also, the mere addition of a few parts to the conventional system hardly increases the weight, volume or manufacturing cost.

The above objects are also fulfilled by a fuel cell system for directly converting a chemical energy of a fuel into an electric energy electrochemically, the system comprising a fuel cell having an anode and a cathode, which is open to outside air at least at a start of the system; an oxygen gas supply device for forcibly supplying an oxygen gas to the cathode when the system goes into a steady-state operation; a first control device for controlling the oxygen gas supply device; a hydrogen storing device having a hydrogen absorbing alloy for dissociating a hydrogen gas at a temperature range from approx. −20° C. to room temperature; a hydrogen supply path for supplying the hydrogen gas from the hydrogen storing device to the anode of the fuel cell; and a second control device for controlling an amount of the hydrogen gas supplied to the anode, the second control device being provided on the hydrogen supply path. An output of the fuel cell supplies power to the first control device so as to put the fuel cell system into steady-state operation, the output being generated by the hydrogen gas supplied to the anode and the air remaining in a vicinity of the cathode. Such a system will be referred to as System [N].

The anode may be connected to a fuel exhaust gas desorbing path equipped with a fuel exhaust gas desorbing valve for desorbing the hydrogen gas remaining in the anode when the system starts and for preventing an erroneous desorption of a fuel during the steady-state operation of the system.

At the start of operation of a system having the above construction the second control device is opened to supply the hydrogen gas from the hydrogen gas storing device to the anode, while the cathode receives air. The power generation starts in this way, and the open circuit voltage is generated. The open circuit voltage drives the first control device, whereby starting the oxygen gas supply device, results in a smooth supply of the oxygen gas to the fuel cell. Since power is continuously supplied from the fuel cell, there is no need for an external hydrogen gas source for the purpose of starting the system.

The hydrogen storing device may have a temperature raising device for raising a temperature of the hydrogen absorbing alloy when the temperature of the hydrogen absorbing alloy is not high enough.

The temperature raising device may comprise a heat exchanger.

The heat exchanger may use an oxygen gas as a heat source.

The heat exchanger may use a combustion gas as a heat source.

The temperature raising device may comprise a heater.

In the above construction, the temperature of the hydrogen absorbing alloy is kept high enough for the alloy to dissociate the hydrogen gas. Therefore, enough hydrogen is dissociated even after the power is generated for a long time.

The hydrogen storing device may have a cooling device for lowering a temperature of the hydrogen absorbing alloy when the temperature of the hydrogen absorbing alloy is too high.

System [N] may further comprise an auxiliary hydrogen storing device for desorbing the hydrogen gas at a higher temperature than the hydrogen storing device having the hydrogen absorbing alloy.

The above objects are also fulfilled by a fuel cell system using a hydrogen absorbing alloy as a hydrogen storing device, the system being characterized in that the hydrogen absorbing alloy has a hydrogen gas absorbing/desorbing equilibrium pressure of no more than 10 atm at an upper limit of a plateau area of the above pressure at the room temperature. Such a system will be referred to as System [P].

The fact that the equilibrium pressure is no more than 10 atm improves safety.

In system [P], a minimum pressure difference for reversibly absorbing and desorbing a 0.6 wt. % hydrogen gas may be set to be 2.0 in a natural logarithm.

The above construction prevents the equilibrium pressure from drastically decreasing at the desorption of the hydrogen gas, and thus maintains the equilibrium pressure high, especially at an initial stage of the hydrogen gas desorption.

The hydrogen absorbing alloy may include an auxiliary hydrogen absorbing alloy having a higher hydrogen gas absorbing/desorbing equilibrium pressure at an equal temperature.

In the above construction, since the hydrogen gas supply is smooth from the start, the fuel cell system is operated smoothly from the start.

The hydrogen absorbing alloy may include an auxiliary hydrogen absorbing alloy having a lower hydrogen absorbing equilibrium pressure at an equal temperature.

The equilibrium pressure is drastically lowered at a final stage of the desorption of the hydrogen gas in the above construction. Accordingly, an appropriate time for supplying the hydrogen gas can be signaled.

The hydrogen absorbing alloy may be selected from a group consisting of an $MgZn_2$-type laves-phase alloy including at least Zr and Mn; an $AB_5$-type hexagonal alloy including at least a rare earth element, Ni, and at least one of the first transition metal elements, Al and Sn; an $AB_5$-type hexagonal alloy including at least Ca, Ni, and at least one of the first transition metal elements, Al, Sn and a rare earth element; an AB-type cubic alloy including at least one selected from a group consisting of Ti, Fe and Co; an $Mg_2CU$-type laves-phase alloy including at least Ti and Cr; an $MgZn_2$-type hexagonal alloy including at least Ti and Cr; and an $AB_2$-type hexagonal alloy including at least Mg and the first transitional metal element.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Embodiment I

Embodiment 1 according to this invention

Figure 1:
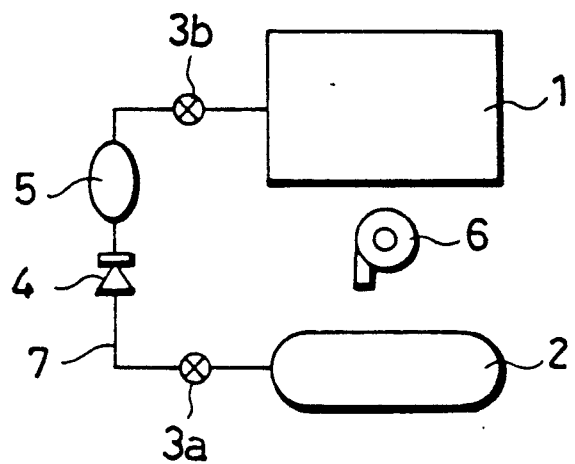
FIG. 1 is a schematic view of a fuel cell system as a first embodiment according to this invention of EMBODIMENT I.

FIG. 1 is a schematic view of a fuel cell system as a first embodiment according to this invention. A fuel cell 1 and a main tank 2 are connected to each other through a hydrogen gas supply path 7. The supply path 7 is equipped with a fuel valve 3a, a nonreturn valve 4, a sub tank 5, and another fuel valve 3b in this order.

The fuel cell 1 comprises a plurality of unit cells, each having an anode and a cathode. An output of the fuel cell is 1 kW.

The main tank 2 contains 10 kg of a rare earth-nickel hydrogen absorbing alloy to supply a hydrogen gas to the fuel cell 1 during a steady-state operation of the system. The rare earth-nickel hydrogen absorbing alloy has an equilibrium characteristic shown with a line "a" of FIG. 2.

The fuel valves 3a and 3b are for allowing or stopping the flow of a hydrogen gas.

The sub tank 5 contains 500 g of a rare earth-nickel hydrogen absorbing alloy, to supply the hydrogen gas at a start of the operation of the system. The rare earth-nickel hydrogen absorbing alloy in the sub tank 5 has an equilibrium characteristic shown with a line "b" of FIG. 2.

Figure 2:
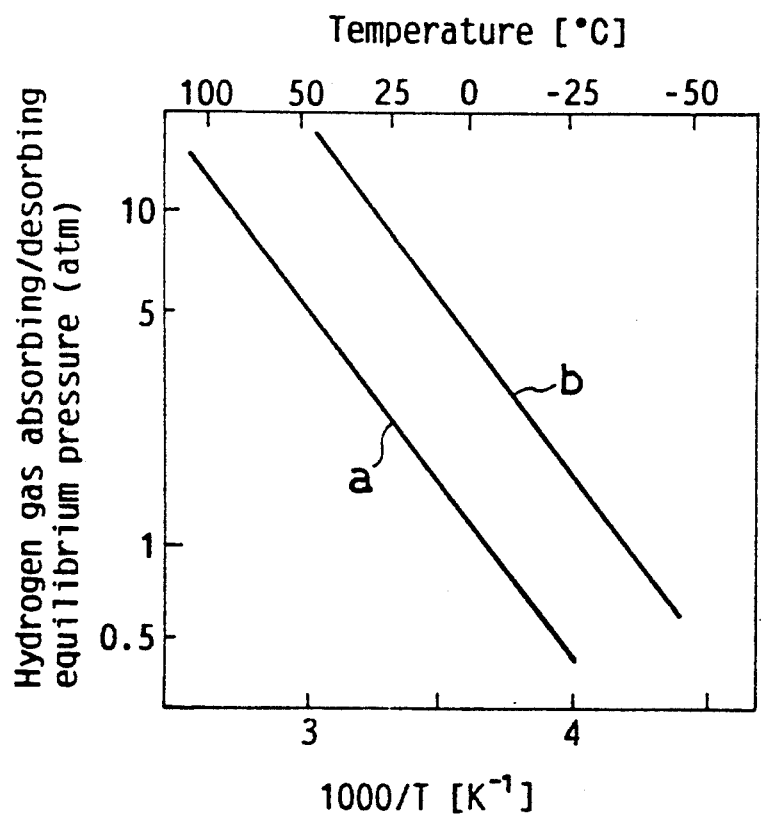
FIG. 2 is a graph showing a relationship between the temperature and the equilibrium pressure of the hydrogen absorbing alloys accommodated in a main tank 2 and a sub tank 5 of the first embodiment.

The hydrogen absorbing alloy in the sub tank 5 has a higher equilibrium pressure than the equilibrium pressure in the main tank 2 at an equal temperature. The hydrogen absorbing alloys having the characteristics of FIG. 2 are employed because the fuel cell system is designed to be used in 10° to 30° C.

The nonreturn valve 4 is for preventing the flow of the hydrogen gas from the sub tank 5 to the main tank 2.

Blower 6 refers to a blower for sending exhaust heat of the fuel cell 1 to the main tank 2.

The fuel cell system having the above construction is operated in the following way.

First, a hydrogen gas and an oxygen gas are respectively supplied to the anode and the cathode of the fuel cell 1 as follows. When the fuel valves 3a and 3b are opened, the hydrogen gas is supplied to the fuel cell 1 from the sub tank 5 through the supply path 7 owing to the inner pressure difference between the fuel cell 1 and the sub tank 5. Although the inner pressure of the main tank 2 is lower than that of the sub tank 5, the nonreturn valve 4 prevents the hydrogen gas from being sent to the main tank 2. The oxygen gas dissolved in an electrolyte in the cathode is naturally supplied to the cathode. A reaction expressed by Equation (1) occurs in the fuel cell 1, thereby generating an electromotive force although the force is low.

$$2H_2 + O_2 \rightarrow 2H_2O + E(V) \tag{1}$$

A blower (not shown) is driven by the above electromotive force to keep supplying air to the cathode.

When the operation starts, the hydrogen gas is desorbed, which is accompanied by heat absorption of the hydrogen absorbing alloy. Consequently, a temperature of the hydrogen absorbing alloy in the sub tank 5 is lowered and so is an inner pressure of the sub tank 5. Although this results in a small decline in the amount of the supplied hydrogen gas, the operation of the system is hardly damaged because the hydrogen absorbing alloy in the sub tank 5 has a high equilibrium pressure. As a result, a temperature of the fuel cell 1 is gradually increased.

Then, the blower 6 is driven by the above electromotive force. The exhaust heat from the fuel cell 1 is sent to the main tank 2. A temperature in the main tank 2 is increased, and so is the equilibrium pressure of the hydrogen absorbing alloy in the main tank 2. When the equilibrium pressure in the main tank 2 exceeds that in the sub tank 5, the hydrogen gas is supplied from the main tank 2 to the fuel cell 1 through the sub tank 5. A steady-state operation starts in this way.

At this time, the temperature in the sub tank 5 is gradually increased as the hydrogen absorbing alloy absorbs heat. Accordingly, an equal amount of hydrogen gas as that desorbed from the sub tank 5 at the start of operation is absorbed into the hydrogen absorbing alloy in the sub tank 5. In short, the hydrogen absorbing alloy in the sub tank 5 desorbs the hydrogen gas at the start of operation and absorbs hydrogen gas during steady-state operation. As a result, the sub tank 5 is again full of the hydrogen gas, so as to easily start the next operation.

The above fuel cell system will be referred to as System A.

COMPARATIVE EXAMPLE

System X, which is identical to System A except that the sub tank 5 is not provided, is used as a comparative example.

Experiment

Figure 3:
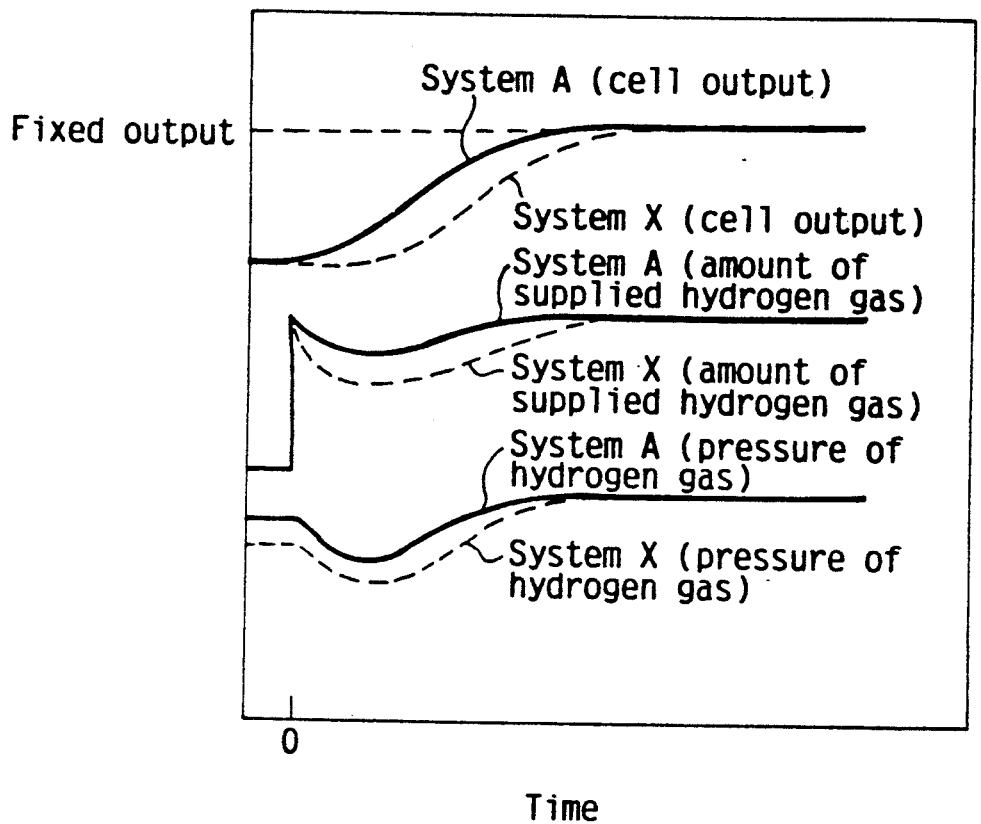
FIG. 3 is a graph showing how the cell output, supplied amount of the hydrogen gas, and the pressure of the hydrogen gas are changed with the passage of time in the first embodiment of this invention and a comparative example.

Regarding Systems A and X, how the cell output, the supplied amount of hydrogen gas, and the hydrogen gas pressure are changed with the passage of time was measured and is shown in FIG. 3.

Since System A showed a smaller fluctuation in both the pressure and the supplied amount of the hydrogen gas than System X, the cell output of System A reached a specified level faster than that of System X.

The above experiment was carried out in an ambient temperature range of 10° to 30° C. In a cold area, a more conspicuous effect can be obtained as will be described hereinafter.

Systems A and X both employ in the main tank 2 the hydrogen absorbing alloy having the characteristic shown with the line "a" of FIG. 2. Such an alloy cannot desorb the hydrogen gas in an ambient temperature of 0° C. or lower because the equilibrium pressure is lower than the atmospheric pressure at the above ambient temperature. This means System X cannot supply the hydrogen gas to the fuel cell 1 at all unless the hydrogen absorbing alloy in the main tank 2 is heated. In System A, on the contrary, the equilibrium pressure in the sub tank 5 is approx. 4 atm, which is higher than the atmospheric pressure, even in the ambient temperature of 0° C. or lower. Accordingly, System A can be operated without heating the hydrogen absorbing alloy.

The fuel cell system according to this invention, which comprises a sub tank and a few contingent parts in addition to the conventional system, is not substantially heavier or larger than the conventional one.

The power generating efficiency is not lowered either because it is not required that the fuel gas burn to heat the hydrogen absorbing alloy as disclosed in Japanese Patent Publication Laid Open No. 56-26113.

The fuel cell system according to this invention also has the following effect in a continuous operation of the fuel cell.

Although a continuous operation of the cell generally causes no problem to the cathode because an air is supplied by a blower or the like by use of a part of the generated power, the hydrogen gas should be supplied in some way to the anode, namely, by replacing the fuel tank. Since the fuel cell system is generally designed for continuous operation, a very quick replacement is requisite in order to avoid the stoppage of the hydrogen gas supply and of the power generation in the conventional system. The fuel cell system according to this invention can supply the hydrogen gas from the sub tank 5 to the fuel cell 1 while the main tank 2 is replaced. There is no hurry in replacing the main tank 2.

Embodiment 2 according to this invention

Figure 4:
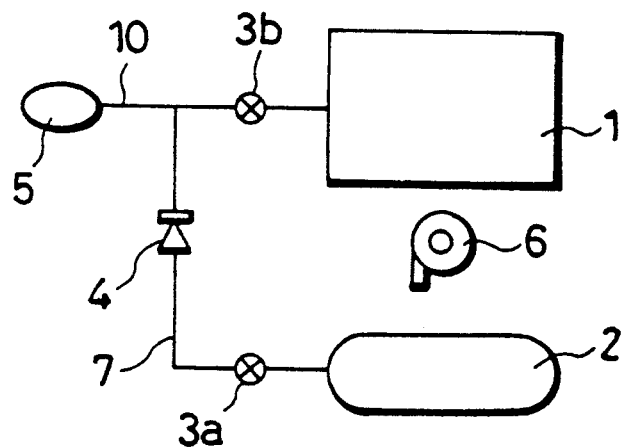
FIG. 4 is a schematic view of a second embodiment according to this invention of EMBODIMENT I.

FIG. 4 is a schematic view of a fuel cell system as a second embodiment of this invention. Concerning this and all the following embodiments, elements identical to those of the first embodiment bear identical numbers and explanation thereof will be omitted.

As shown in FIG. 4, the fuel cell system has the same construction as System A except that the sub tank 5 is provided on a sub path 10 which is branched from the supply path 7.

It has been confirmed through experiments that the fuel cell system having this construction has the same effects as System A.

Embodiment 3 according to this invention

At the ambient temperature of 30° C. or lower, the equilibrium pressure in the sub tank 5 is as low as approx. 10 atm, which will not cause any problems to the systems of the first and the second embodiments. When the system is used outside on a hot summer day, however, ambient temperature sometimes exceeds 50° C. In such a case, the equilibrium pressure is increased, thereby causing gas leakage or other problems. Such problems are solved by desorbing the hydrogen gas through a relief valve attached to a piping system when the equilibrium pressure reaches a specified level.

This means, however, discarding the hydrogen gas, which is the fuel. That is, both the cost performance and the power generating efficiency are lowered. Desorbing the flammable gas also causes a problem in terms of safety.

Figure 5:
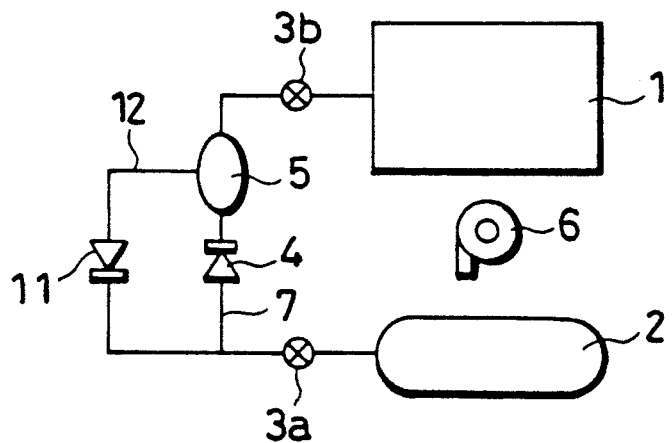
FIG. 5 is a schematic view of a third embodiment according to this invention of EMBODIMENT I.

A third embodiment of this invention in FIG. 5 is for preventing gas leakage or other problems even at an ambient temperature of higher than 30° C. This embodiment is identical to System A except that this embodiment further comprises a hydrogen gas circulating path 12 for circulating the hydrogen gas from the sub tank 5 toward the main tank 2 and a back pressure valve 11 provided on the path 12. An operating pressure of the back pressure valve 11, which should be a little lower than the pressure resistance of the sub tank 5, is usually set at 10 to 30 atm (15 atm in this embodiment). The pressure of the back pressure valve 11 may be fixed or variable.

In such a construction, the sub tank 5 and the main tank 2 are connected to each other through the circulating path 12 equipped with the back pressure valve 11. In this construction, when the inner pressure of the sub tank 5 is increased to 15 atm. along with the increase of the ambient temperature up to 35° C., the back pressure valve 11 is opened. Since the inner pressure of the main tank 2, which is approx. 3 atm, is lower than that in the sub tank 5, the hydrogen gas is returned to the main tank 2. There is no need for desorbing the hydrogen gas outside and it is that pressure of the whole system cannot exceeds a specified level. As a result, safety, the power generating efficiency and the cost performance are all improved.

The third embodiment, which comprises a few parts in addition to System A, is hardly heavier, larger or more expensive than System A.

Embodiment 4 according to this invention

Figure 6:
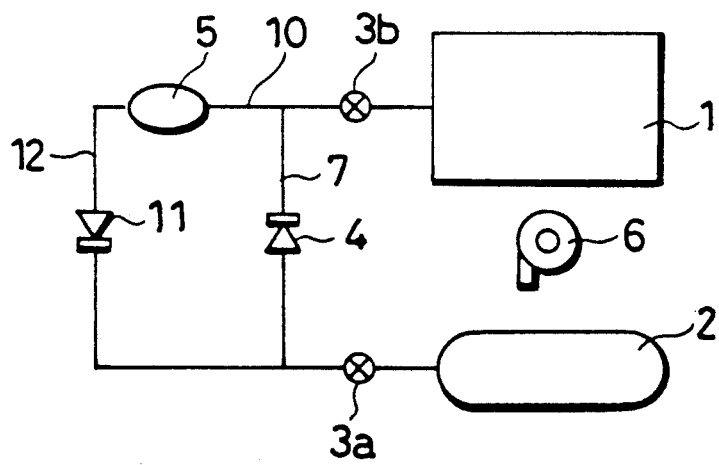
FIG. 6 is a schematic view of a fourth embodiment according to this invention of EMBODIMENT I.

A fourth embodiment is shown in FIG. 6. This embodiment is identical to the second embodiment except that this embodiment further comprises the hydrogen gas circulating path 12 for circulating the hydrogen gas from the sub tank 5 toward the main tank 2 and a back pressure valve 11 provided on the path 12.

It has been confirmed through experiments that the fuel cell system having this construction has the same effect as the third embodiment.

Other items to note

Instead of rare earth-nickel alloy, iron-titanium or titanium-manganese alloy may be used.

Embodiment II

Embodiment 1 according to this invention

Figure 7:
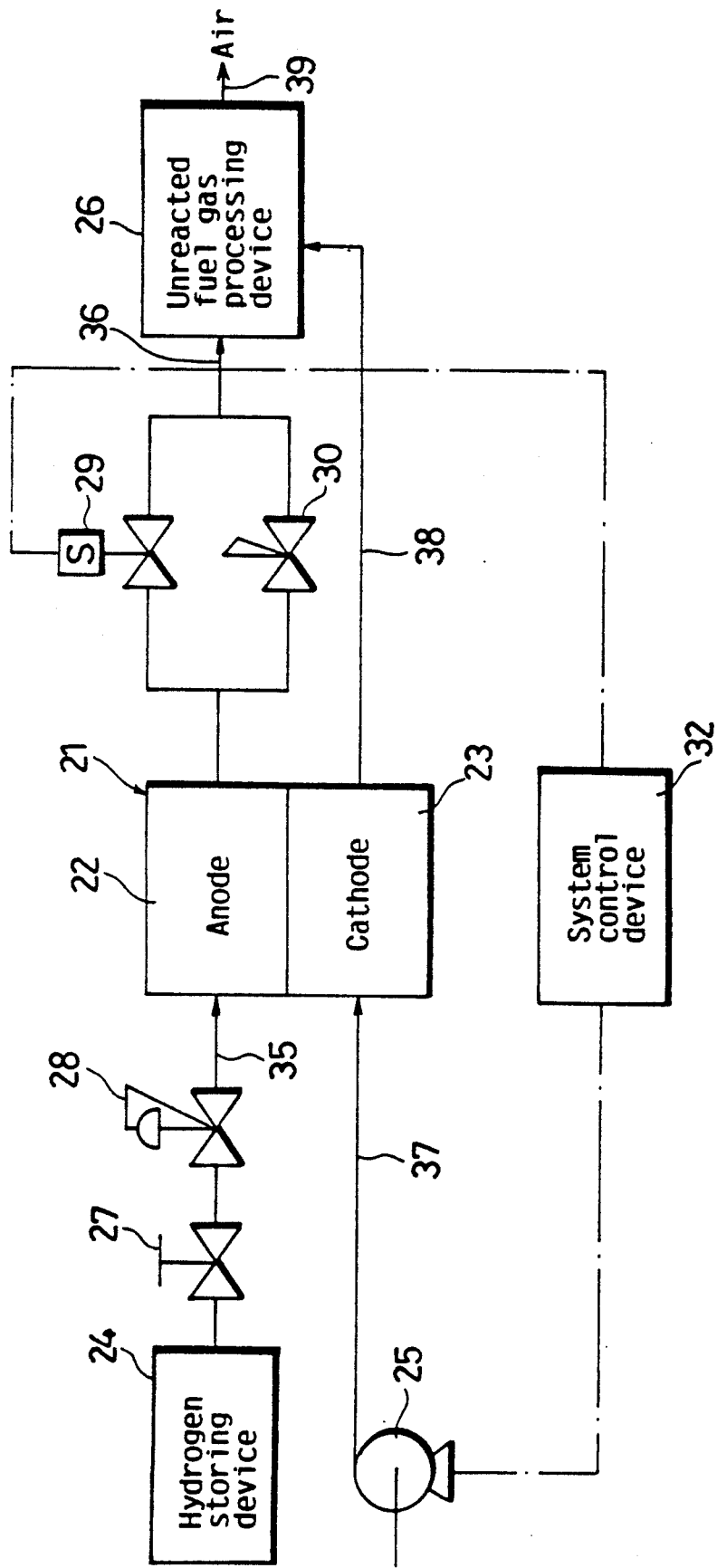
FIG. 7 is a schematic view of a fuel cell system as a first embodiment according to this invention of EMBODIMENT II.

FIG. 7 is a schematic view of a fuel cell system as a first embodiment of EMBODIMENT II. This and the following embodiments of EMBODIMENT II use hydrogen gas as the fuel.

As shown in FIG. 7, the fuel cell system comprises a fuel cell 21, a hydrogen storing device 24, an air supply device 25, an unreacted fuel gas processing device 26, a fuel gas supply valve 27, a pressure reducing valve 28, a first fuel gas desorbing valve 29, a second fuel gas desorbing valve 30, a system control device 32, a fuel gas supply path 35, a fuel gas desorbing path 36, an air supply path 37, an air desorbing path 38 and a combustion gas desorbing path 39.

The fuel cell 21 comprises a plurality of unit cells which are laminated into a laminated body and cooling plates interposed every several unit cells. The laminated body is tightened by upper and lower plates. The laminated body is cooled by an excess of reaction air. FIG. 7 shows one unit cell comprising an anode 22 and a cathode 23.

The hydrogen storing device 24 includes a hydrogen absorbing alloy which can dissociate a hydrogen gas in a temperature range of approx. −20° C. to the room temperature, thereby to supplying the hydrogen gas to the fuel cell 21. As the hydrogen absorbing alloy, a rare earth-nickel, a titanium-iron, or a titanium-chrome alloy is employed.

The unreacted fuel gas processing device 26 is for burning the unreacted hydrogen gas with exhaust air and then desorbing the combustion gas into an outside air through the combustion gas desorbing path 39.

The fuel gas supply valve 27 and the pressure reducing valve 28 are provided on the fuel gas supply path 35. The pressure reducing valve 28 is for keeping an inner pressure of the anode 22 at a fixed level. Practically, when a load is increased to lower the inner pressure of the anode 22, the pressure reducing valve 28 is opened wider. When the load is decreased to raise the inner pressure of the anode 22, the pressure reducing valve 28 is narrowed. In this way, the supplied amount of fuel is adjusted to match the load.

The first fuel gas desorbing valve 29 and the second fuel gas desorbing valve 30 are provided on the fuel gas desorbing path 36. The second fuel gas desorbing valve 30 is controlled to open narrower than the first fuel gas desorbing valve 29. When the system is started, the first fuel gas desorbing valve 29 is opened to desorb the gas remaining in the anode 22, thereby replacing the gas with the hydrogen gas quickly. The second fuel gas desorbing valve 30 may be either opened or closed. After the system goes into steady-state operation, the first fuel gas desorbing valve 29 is closed and the second fuel gas desorbing valve 30 is opened to desorb a small amount of hydrogen gas. In this way, the fuel is prevented from being desorbed erroneously while a gas too inactive to be used as fuel, such as steam, is prevented from remaining in the anode 22 or the fuel gas desorbing path 36. The first fuel gas desorbing valve 29 is desirably closed after an open circuit voltage which is high enough is generated. The unreacted hydrogen gas is supplied to the fuel gas processing device 26 through the fuel gas desorbing path 36.

The system control device 32, for electrically controlling the air supply device 25 and the first fuel gas desorbing valve 29, uses the fuel cell 21 as a power source.

The fuel cell system having the above construction is operated in the following way.

The hydrogen gas is supplied to the anode 22 from the hydrogen storing device 24 through the fuel gas supply path 35. Since the first fuel gas desorbing valve 29 is open, the gas which filled the anode 22 and the fuel gas desorbing path 36 before the system was started is quickly desorbed through the first fuel gas desorbing valve 29. If the second fuel gas desorbing valve 30 is open, the valve 30 is also used to desorb the above gas. In this way, the gas is replaced with the hydrogen gas in the anode 22. Since the air supply path 37 leading to the cathode 23 is opened to the outside air, the vicinity of the cathode 23 is filled with the air. The air in the vicinity of the cathode 23 and the hydrogen gas in the anode 22 generate the open circuit voltage. When the level of the open circuit voltage gets high enough, the system control device 32 is automatically started by a circuit (as described later), whereby the system goes into steady-state operation. Namely, the steady-state operation is started by the supply of a large amount of air from the air supply device 25 to the cathode 23 and the supply of the hydrogen gas whose pressure is reduced by the pressure reducing valve 28 to the anode 22.

When steady-state operation is started, the first fuel gas desorbing valve 29 is closed (if the valve 30 is closed, the valve 30 should be opened). By this operation, the unreacted hydrogen gas is desorbed through the second fuel gas desorbing valve 30 together with the gas such as stream, to inactive to be used as the fuel. The hydrogen gas and the inactive gas are burned by the fuel processing device 26 and desorbed into the outside air.

The fuel cell 21 is cooled by the reaction air supplied to the cathode 23.

Figure 8:
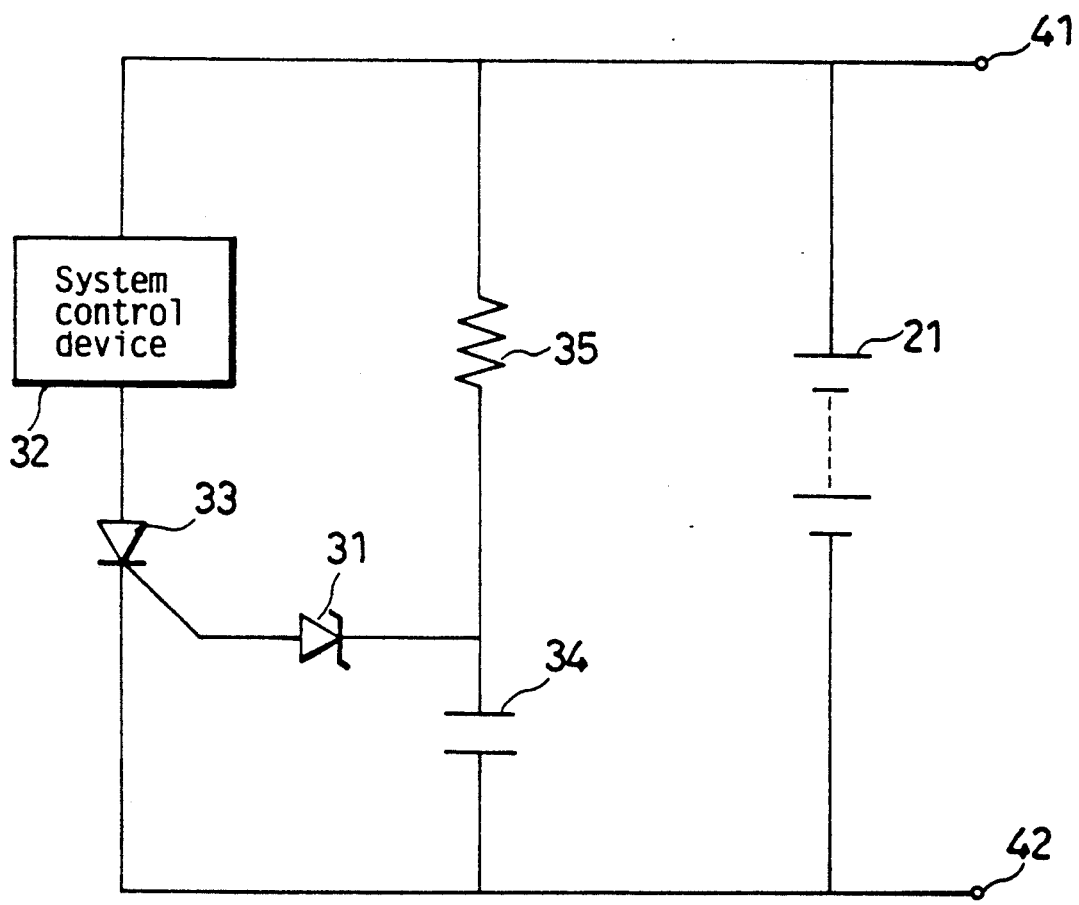
FIG. 8 is a circuit diagram for starting a system control device of the first embodiment of EMBODIMENT II.

A circuit for starting the above system is shown in FIG. 8. The circuit comprises the fuel cell 21, the system control device 32, a thyristor 31 acting as a power switch of the system control device 32, a zener diode 33, a capacitor 34 and a resistor 35. 41 and 42 refer to external terminals of the power.

When the supply of the hydrogen gas to the fuel cell 21 is started, a voltage of the fuel cell 21 is raised, and voltages applied to both ends of the capacitor 34 and the zener diode 33 are gradually heightened. When the voltage of the fuel cell 21 is further raised and thus the zener diode 33 receives a voltage higher than the zener potential, the zener diode 33 is electrified, whereby the charge on the capacitor 34 is discharged through a gate of the thyristor 31. When the thyristor 31 is triggered and so electrified by this operation, the system control device 32 receives the power, thereby to starting the steady-state operation.

In this embodiment, which employs a the hydrogen-air fuel cell, an open circuit voltage of approx. 850 mV per unit cell is enough to confirm the supply of enough hydrogen gas to the fuel cell. Accordingly, the zener potential is desirably close to a value obtained by multiplying a number of the laminated unit cells by 850 mV.

This system requires no built-in storage cell to supply power from outside or for starting the system. It is possible to have a built-in storage cell if the system is used in a cold area or if the system construction demands that.

Instead of two fuel gas desorbing valves, only one such valve which can be fine-adjusted may be provided.

The supply of the power to the system control device 32 may be done manually.

Embodiment 2 according to this invention

Figure 9:
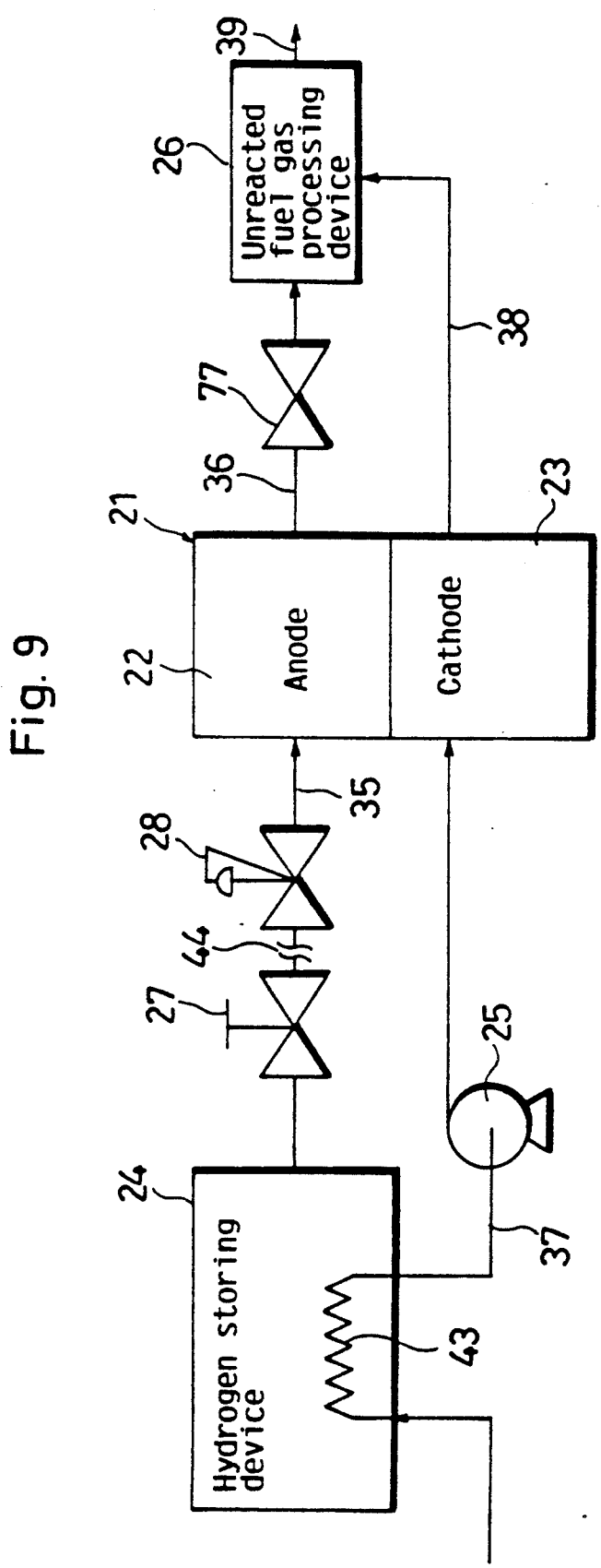
FIG. 9 is a schematic view of a second embodiment according to this invention of EMBODIMENT II.

FIG. 9 shows a second embodiment of EMBODIMENT II. Concerning this and all the following embodiments, elements identical to those of the first embodiment bear identical numbers and explanation thereof will be omitted. Also in this and the following embodiments, the system control device 32 is eliminated and one fine-adjustable fuel gas desorbing valve 77 is provided instead of two.

The hydrogen storing device 24 has a heat exchanger 43 which is provided upstream from the air supply device 25 on the air supply path 37. The numeral 44 refers to a connecting member. The hydrogen storing device 24 is easily replaced by disconnecting the connecting member 44.

In general, when the hydrogen absorbing alloy desorbs the hydrogen gas during power generation, the temperature of the hydrogen absorbing alloy is gradually lowered, thereby decreasing the ambient temperature, resulting in difficulty in supplying the hydrogen gas.

In the above construction, the air in the air supply path 37 and the hydrogen absorbing alloy in the hydrogen storing device 24 exchange heat through heat exchanger 43, thereby preventing a drastic decline in the temperature (down to $-20°$ C., which is the lowest possible temperature for the hydrogen absorbing alloy to dissociate the hydrogen gas) of the hydrogen absorbing alloy. Accordingly, enough hydrogen gas is dissociated even if the power generation is carried out for a long time. As a result, the power generation is done smoothly without a separate hydrogen gas source, and thus the system can be simplified.

Also in the above construction, the dehumidification of the reaction air caused by the condensation of the steam in the air promotes the removal of water generated in the cathode 23.

Although the reaction air is used to cool the fuel cell 21 in the above embodiments, the cooled air and the hydrogen absorbing alloy may exchange heat by a cooling air path provided in addition to the air supply path 37. In this case, the cooled air is further cooled, which further promotes the cooling of the fuel cell 21.

When the system is used in a cold area or in the winter, the hydrogen storing device 24 may be equipped with a heater or the like as the hydrogen dissociator.

Embodiment 3 according to this invention

Figure 10:
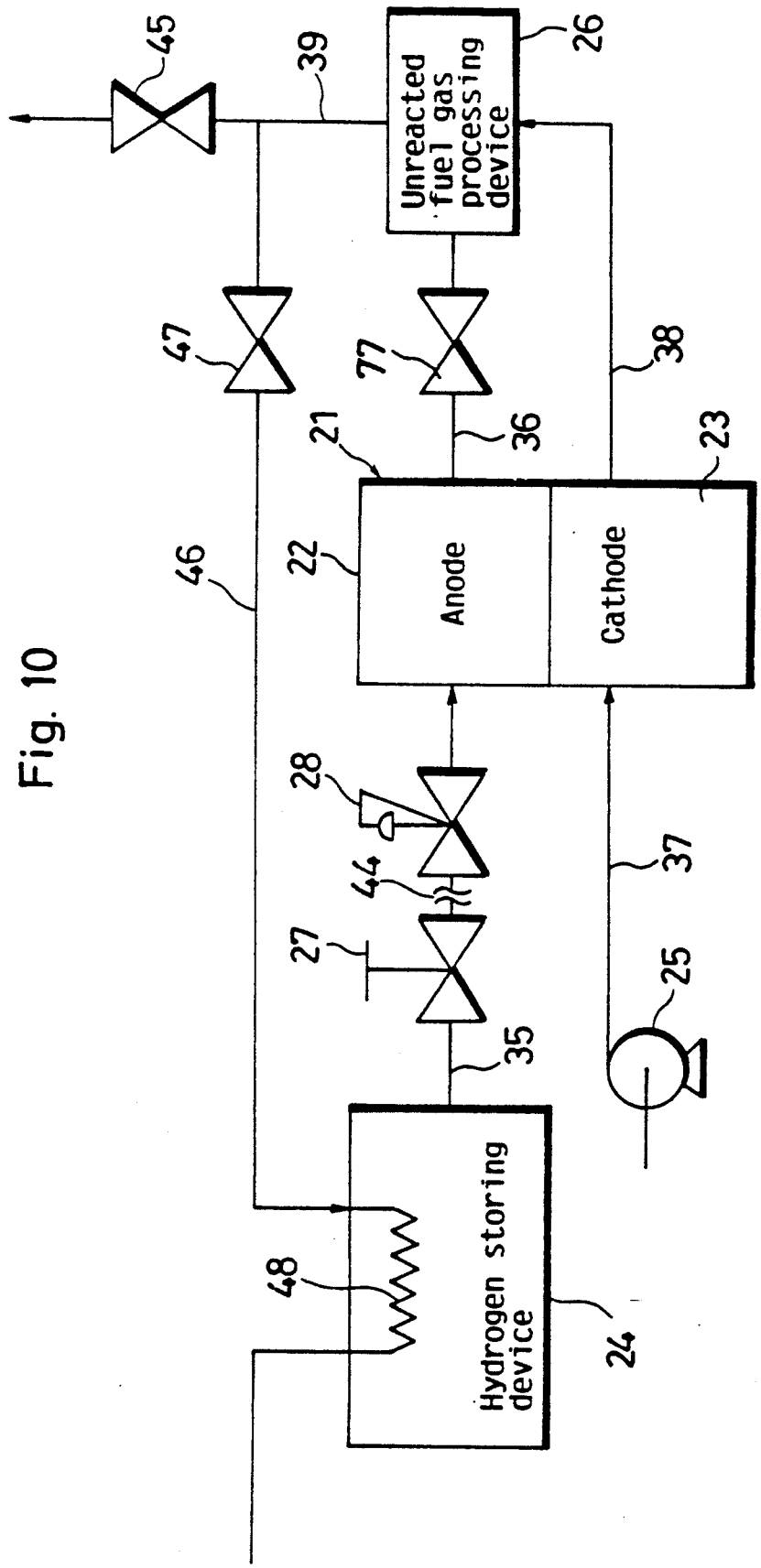
FIG. 10 is a schematic view of a third embodiment according to this invention of EMBODIMENT II.

FIG. 10 shows a third embodiment of EMBODIMENT II.

The combustion gas desorbing path 39 provided downstream from the unreacted gas processing device 26 is equipped with a combustion gas desorbing valve 45, and a gas path 46 for increasing the temperature of the hydrogen absorbing alloy is branched from the combustion gas desorbing path 39. The gas path 46 is equipped with a temperature adjusting valve 47 and a heat exchanger 48, and the heat exchanger 48 is provided in the hydrogen storing device 24.

In the above construction, the combustion gas desorbed after the exhaust air and the unreacted air are burned in the unreacted fuel gas processing device 26 is supplied to the heat exchanger 48 through the gas path 46. The hydrogen absorbing alloy is heated and so enough hydrogen gas is dissociated, whereby the hydrogen gas is smoothly supplied to the anode 22. After that, the combustion gas is desorbed outside. In order to avoid an excessive increase in temperature in the hydrogen storing device 24, which would excessively increase an inner pressure in the device 24, the combustion gas desorbing valve 45 and the temperature adjusting valve 47 are adjusted to desorb the extra combustion gas outside.

Figure 11:
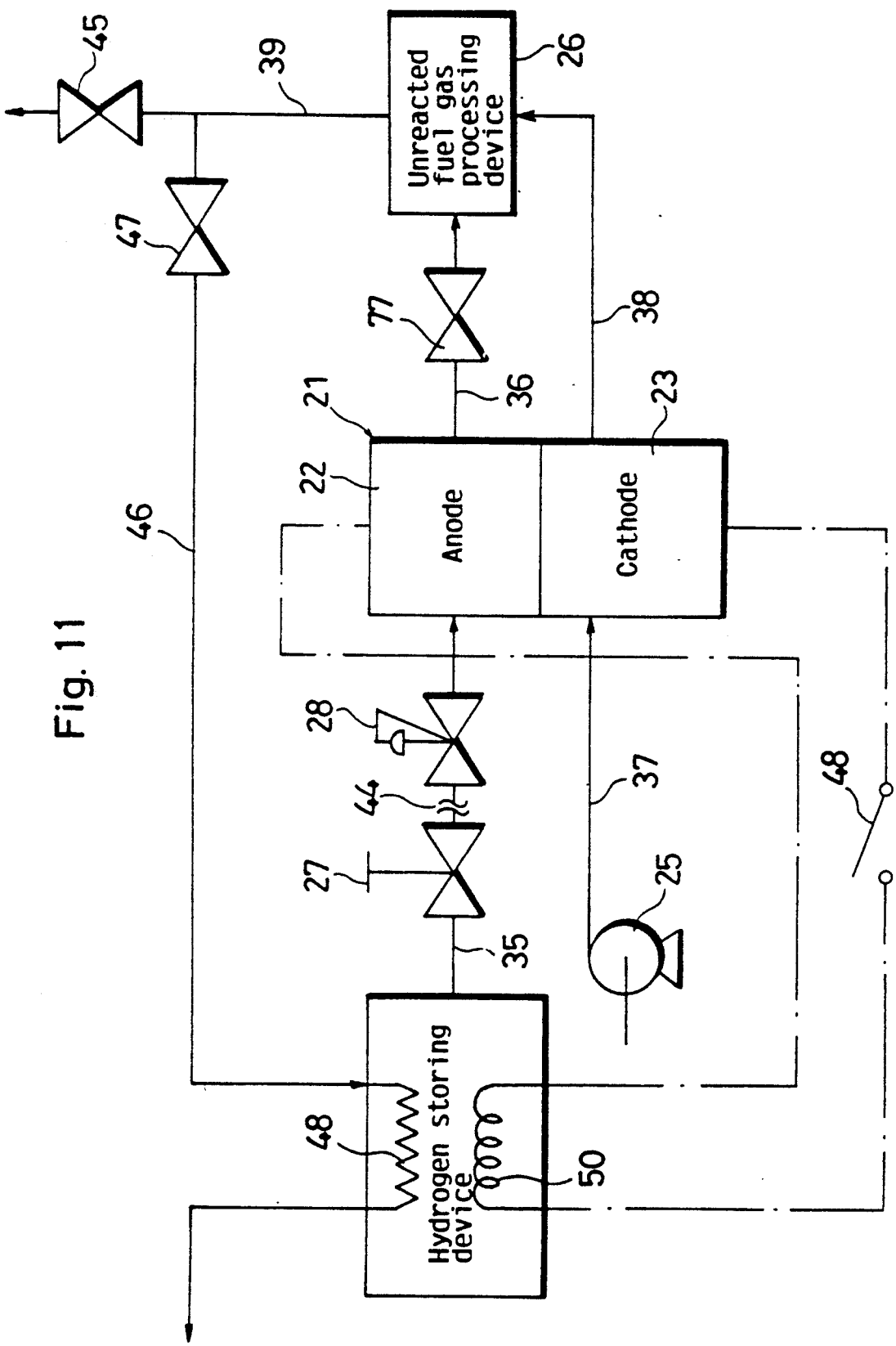
FIG. 11 is a schematic view of a modification of the third embodiment according to this invention of EMBODIMENT II.

If the system is used in a cold area or in the winter, a heater 50 may be provided in the hydrogen storing device 24 as shown in FIG. 11. The heater 50 is operated by turning on a switch 48. The addition of the heater 50 further promotes the smooth power generation. When the temperature in the fuel cell 21 is raised, the heater 50 is stopped so that the temperature in the hydrogen storing device 24 is increased only by the combustion gas. The heater 50 may be operated by a storage cell.

Embodiment 4 according to this invention

Figure 12:
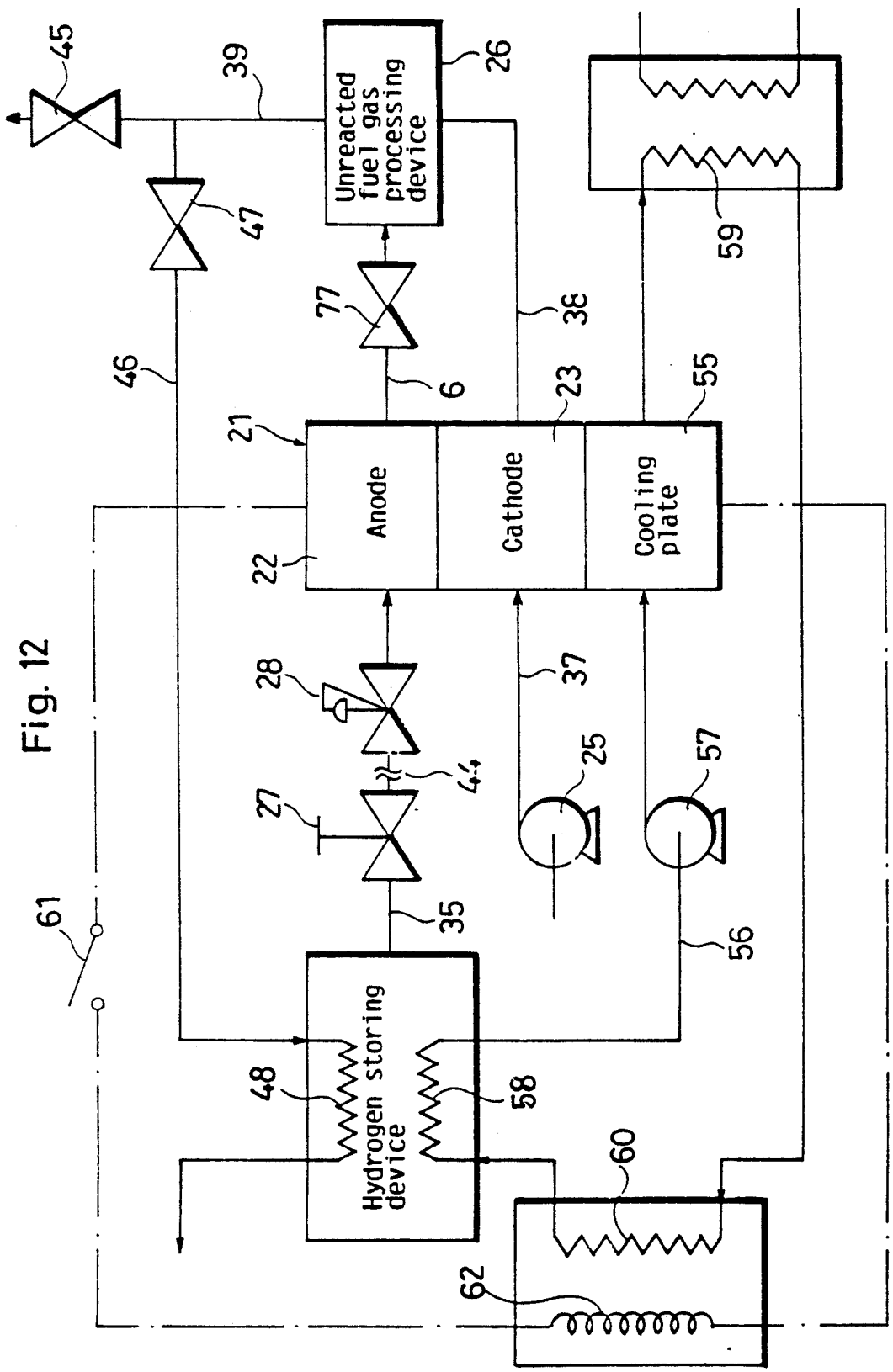
FIG. 12 is a schematic view of a fourth embodiment according to this invention of EMBODIMENT II.

FIG. 12 shows a fourth embodiment of EMBODIMENT II.

In this embodiment, a refrigerant path 56 is provided for cooling a cooling plate 55 of the fuel cell 21. The refrigerant path 56 is equipped with a refrigerant circulating device 57 for circulating a liquid refrigerant and three heat exchanger 58 through 60. The heat exchanger 58 is for raising the temperature of the hydrogen absorbing alloy within a short time at and after the system starts, the heat exchanger 59 is for preventing an excessive increase in the temperature of the hydrogen absorbing alloy during the steady-state operation, and the heat exchanger 60 is for raising the temperature of the refrigerant within a short time at and after the system starts. The heat exchanger 60 is also heat-exchanged with a heater 62. The heater 62 and the refrigerant circulating device 57 are operated by the fuel cell 21. (A circuit of the refrigerant circulating device 57 is not shown.) The heater 62 is turned on or off by a switch 61.

When power generation is started, the air supply device 25 and the refrigerant circulating device 57 are started and simultaneously the switch 61 is turned on to electrify the heater 62. The refrigerant is heated by the heat exchanger 60 and then exchanges heat with the hydrogen absorbing alloy through the heat exchanger 59, whereby the hydrogen absorbing alloy is heated. Then, the refrigerant goes through the cooling plate 55 to heat the fuel cell 21, and is again heated by the heater 62. The above operation is repeated. The temperature of the fuel cell 21 is raised by the heater 62 acting as a load as well as by the refrigerant as above. The heat exchanger 59 is not operated immediately after the system starts.

When steady-state operation is started (when the temperature of the fuel cell 21 reaches the level of the steady-state operation), the switch 61 is turned off to stop heating the refrigerant, and simultaneously the heat exchanger 59 starts operating. The heat of the refrigerant, which is desorbed outside by the heat exchanger 59, is cooled to a certain extent. This prevents the hydrogen absorbing alloy from being heated excessively, whereby preventing the desorption of an excessive amount of hydrogen gas. Since the cooling plate 55 is cooled by the refrigerant, the fuel cell 21 is smoothly cooled.

According to this embodiment, the hydrogen absorbing alloy is heated by the refrigerant in addition to the combustion gas, resulting in a smoother power generation.

Even in a system in which the hydrogen gas is not desorbed outside, the same operation as above is possible by use of the unreacted air.

In an air-cooled fuel cell, the heat exchanger 59 may be replaced by a device for exchanging a portion of the cooled air with air at room temperature.

Embodiment 5 according to this invention

Figure 13:
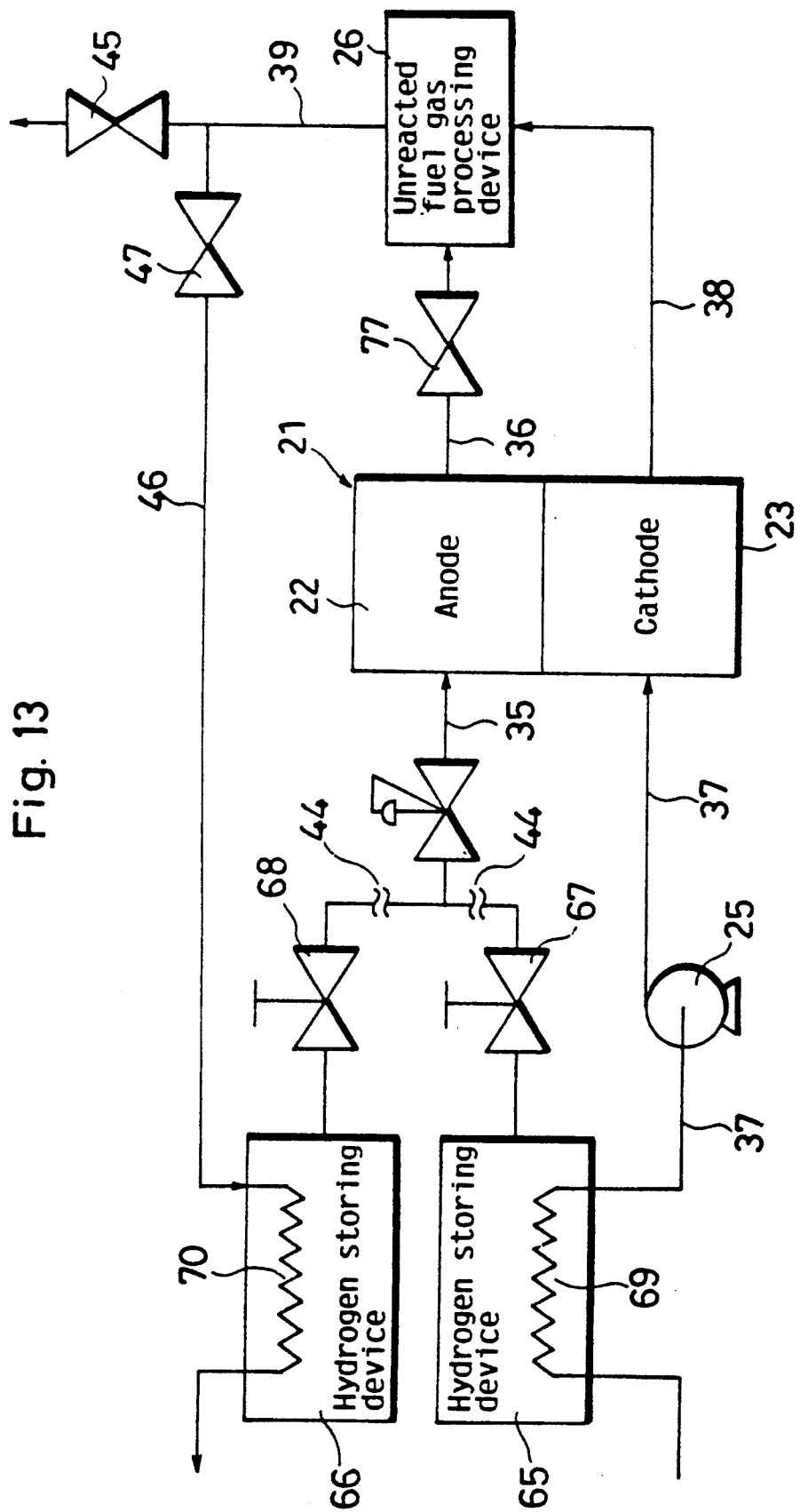
FIG. 13 is a schematic view of a fifth embodiment according to this invention of EMBODIMENT II.

A fifth embodiment of EMBODIMENT II is shown in FIG. 13.

This embodiment is equipped with first and second hydrogen storing devices 65 and 66, in correspondence with which two fuel gas supply valve 67 and 68 and two heat exchangers 69 and 70. The first hydrogen storing device 65 has therein a hydrogen absorbing alloy which shows a hydrogen absorbing equilibrium pressure of no lower than the atmospheric pressure in a temperature range from room temperature to $-20°$ C. The second hydrogen storing device 66 has therein a hydrogen absorbing alloy which desorbs the hydrogen gas at a higher temperature than the first device 65. While the first device 65 exchanges heat with the air, the second device 66 is heat-exchanged with the combustion gas.

At the start of the system, the fuel gas supply valve 67 is opened to desorb the hydrogen gas from the first hydrogen storing device 65 and to supply the hydrogen gas to the anode 22, whereby power generation is started. The temperature of the hydrogen absorbing alloy in the hydrogen storing device 65 would usually be lowered by the desorption of the hydrogen gas. However, since the hydrogen absorbing alloy exchanges heat with the air by the heat exchanger 69 in this construction, the temperature decline cannot take place and so the hydrogen gas is smoothly desorbed without fail.

During the steady-state operation, the hydrogen absorbing alloy in the hydrogen storing device 66 exchanges heat with the combustion gas through heat exchanger 70, whereby the temperature of the hydrogen absorbing alloy is gradually raised. When the inner pressure of the hydrogen storing device 66 exceeds that of the hydrogen storing device 65, the fuel gas supply valve 68 is opened. In this way, the hydrogen gas is supplied from the hydrogen absorbing alloy in the hydrogen storing device 66 to the anode 22. Such hydrogen gas is used for the power generation. The hydrogen gas is also supplied to the hydrogen gas absorbing alloy in the hydrogen storing device 65, where the hydrogen absorbing alloy absorbs the hydrogen gas. The temperature of the hydrogen absorbing alloy in the device 65 is raised at this time but is lowered thereafter since the hydrogen absorbing alloy exchanges heat with reaction air through heat exchanger 69.

If a temperature of the unreacted air is increased along with the temperature of the fuel cell 21, the exhaust heat of the fuel cell 21 is supplied to the device 66 as well as the combustion heat of the unreacted hydrogen gas.

If the reaction air and the air for cooling flow in different paths in an air-cooled fuel cell, or in a liquid-cooled fuel cell, the hydrogen storing devices 65 and 66 may each be equipped with a heat exchanger which can exchange heat with the refrigerant.

If the hydrogen gas has been supplied to the device 65 in a sufficient amount by use of the hydrogen gas from the device 66, by the time the devices 65 and 66 are separated through the disconnection of the connecting members 44, only the device 66 needs to be replaced.

Embodiment III

Embodiment 1 according to this invention

A misch metal (Mm; a compound of rare earth elements) available in the market, Ni and Mn were mixed in an element ratio of 1:4.8:0.2, and the mixture obtained was dissolved in an arc furnace of an argon gas atmosphere and cooled to obtain an ingot of a hydrogen absorbing alloy expressed by $MmNi_{4.8}Mn_{0.2}$. This hydrogen absorbing alloy will be referred to as Alloy $b_1$.

When Alloy $b_1$ is used to produce a fuel cell, the ingot is powdered by a bowl mill, to a grain diameter of 50 $\mu$m or less, and a container is filled with the powders.

A fuel cell system employing the above fuel cell comprises a cathode, an anode and an electrolyte plate therebetween. For power generation, a hydrogen gas is supplied to the anode.

Embodiments 2 through 4 according to this invention

Hydrogen absorbing alloys $Ca_{0.7}Mm_{0.3}Ni_{4.8}Al_{0.2}$ ($AB_5$-type alloy; referred to as Alloy $b_2$), $TiFe_{0.8}Mn_{0.2}$ (AB-type alloy; referred to as Alloy $b_3$), and $Ti_{1.2}Cr_{1.2}Mn_{0.8}$ ($Mg_2Cu$-type alloy; referred to as Alloy $b_3$) were produced in the same way as Alloy $b_1$ but using different materials.

Experiment 1

Figure 14:
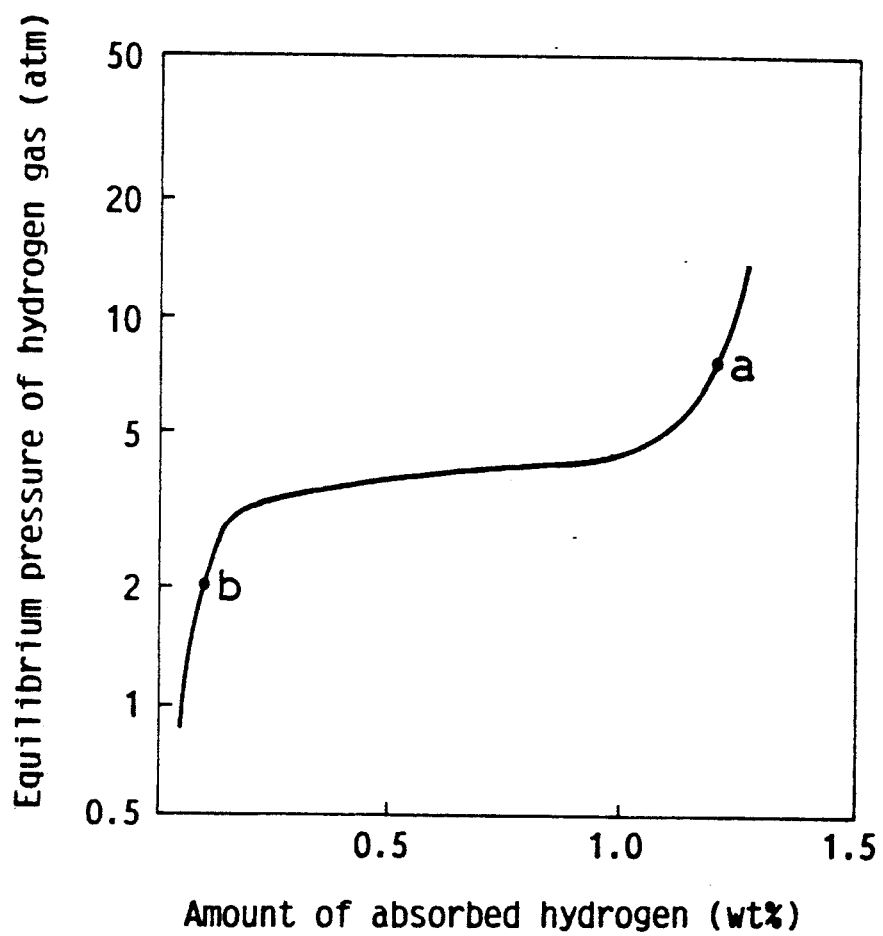
FIG. 14 is a graph showing a relationship between the equilibrium pressure and the amount of hydrogen gas absorbed by Alloy $b_1$ at 25° C.

Regarding Alloy $b_1$, a relationship between the equilibrium pressure and the amount of absorbed hydrogen gas at a room temperature (25° C.) was examined and is shown in FIG. 14.

In FIG. 14, the equilibrium pressure at an upper limit (indicated with "a") of the plateau area is 9.5 atm. This means the above equilibrium pressure is no more than 9.5 atm when the hydrogen gas supply is started. Thus, excellent safety is achieved.

Iron-titanium-, magnesium- and lanthanum-type alloys are known as hydrogen absorbing alloys. The irontitanium-type alloy requires a high temperature and a high pressure (400° C. and; 40 atm at the minimum) for an activation at an initial stage of reaction. This is not safe. The magnesium-type alloy also has a safety problem since a very low reaction speed thereof requires the activation to be done at a high temperature (300° C. or more). The lanthanum-type alloy is not practical because of expensive lanthanum metal (20,000 to 50,000 yen/kg) included therein at approx. 20 to 30%.

Alloy $b_1$ according to this invention, which can lower the equilibrium pressure by substantially eliminating use of the expensive lanthanum, improves the safety of the fuel cell system at a low cost.

A minimum pressure difference for reversibly absorbing and desorbing the hydrogen gas whose valid moving amount per unit weight of the alloy is 0.6 wt. % (the amount of the absorbed hydrogen gas is, for embodiment, 0.3 wt. % to 0.9 wt. %) is approx. 2.0 in natural logarithms. The above minimum pressure difference means the hydrogen gas pressure difference with respect to the valid moving amount of hydrogen gas. Since the hydrogen gas pressure is not lowered drastically, the initial hydrogen gas pressure is maintained high and the hydrogen gas is desorbed smoothly. In FIG. 14, the equilibrium pressure at a lower limit (indicated with "b") of the plateau area at a final stage of the hydrogen gas desorption is no less than 2 atm, meaning the hydrogen gas is smoothly desorbed until no gas is left.

Experiment 2

A maximum and a minimum operating pressure of Alloys $b_1$ through $b_4$ were checked and are shown in Table 1.

TABLE 1

| Alloy | Composition | Operating pressure Max. | Min. |
|---|---|---|---|
| $b_1$ | $MmNi_{4.8}Mn_{0.2}$ | 8 | 2 |
| $b_2$ | $Ca_{0.7}Mm_{0.3}Ni_{4.8}Al_{0.2}$ | 2 | 1 |
| $b_3$ | $TiFe_{0.8}Mn_{0.2}$ | 5 | 2 |
| $b_4$ | $Ti_{1.2}Cr_{1.2}Mn_{0.8}$ | 7 | 3 |

As well as Alloy $b_1$, Alloys $b_2$ through $b_4$ each have an operating pressure of no more than 10 atm at the maximum.

Embodiment 5 according to this invention

Alloy $b_1$ and another hydrogen absorbing alloy expressed with $MmNi_5$, which has a higher equilibrium pressure than Alloy $b_1$ at an equal temperature, were mixed in a weight ratio of 80:20. The above hydrogen absorbing alloy mixture will be referred to as Alloy $b_5$.

Embodiment 6 according to this invention

Alloy $b_2$ and another hydrogen absorbing alloy expressed with $MmNi_{4.8}Al_{0.2}$, which has a higher equilibrium pressure than Alloy $b_2$ at an equal temperature, were mixed in a weight ratio of 80:20. The above hydrogen absorbing alloy mixture will be referred to as Alloy $b_6$.

Embodiment 7 according to this invention

Alloy $b_3$ and another hydrogen absorbing alloy expressed with TiFe, which has a higher equilibrium pressure than Alloy $b_3$ at an equal temperature, were mixed in a weight ratio of 80:20. The above hydrogen absorbing alloy mixture will be referred to as Alloy $b_7$.

Embodiment 8 according to this invention

Alloy $b_4$ and another hydrogen absorbing alloy expressed with TiCr, which has a higher equilibrium pressure than Alloy $b_4$ at an equal temperature, were mixed in a weight ratio of 80:20. The above hydrogen absorbing alloy mixture will be referred to as Alloy $b_8$.

Experiment 3

Figure 15:
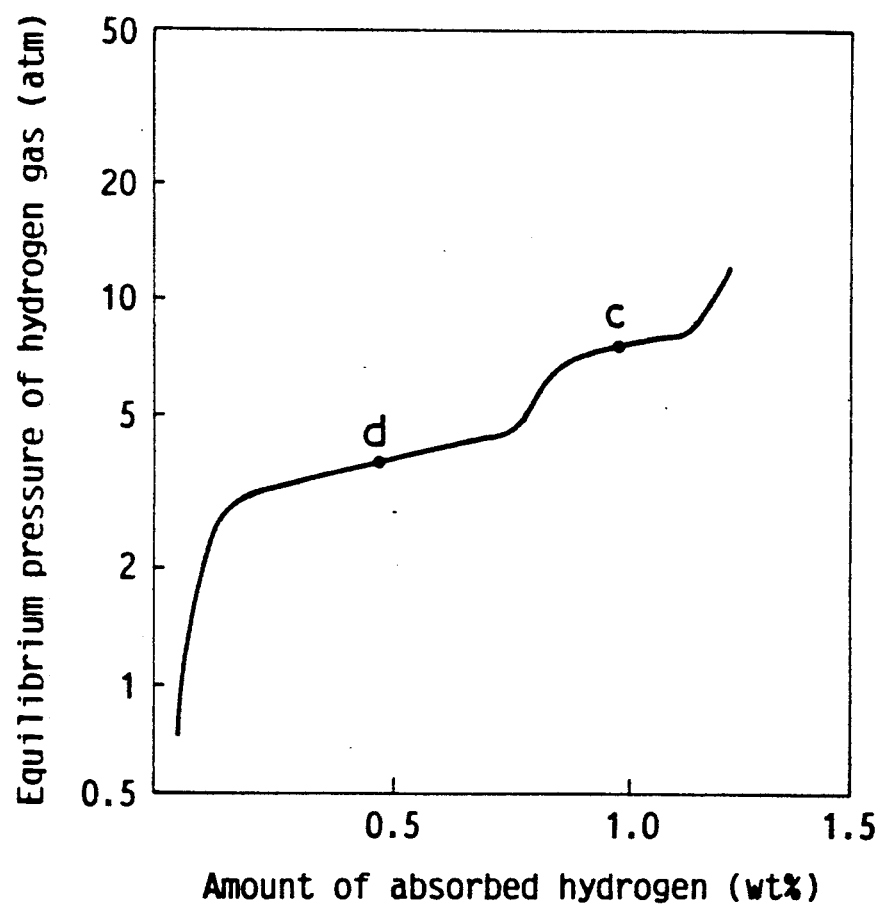
FIG. 15 is a graph showing a relationship between the equilibrium pressure and the amount of hydrogen gas absorbed by Alloy $b_5$ at 25° C.

Regarding Alloy $b_5$, a relationship between the equilibrium pressure and an amount of absorbed hydrogen gas at a room temperature (25° C.) was examined and is shown in FIG. 15.

In FIG. 15, the equilibrium pressure is high (but no higher than 10 atm) in the plateau area indicated with "c", which means a smoother supply of hydrogen gas at an initial stage of the hydrogen gas supply.

In the plateau area of the steady-state operation (indicated with "d"), the hydrogen gas pressure is approximately the same as the case of Alloy $b_1$. It can be said that Alloy $b_5$ also has the effects of Alloy $b_1$.

Experiment 4

Concerning Alloys $b_6$ through $b_8$, the hydrogen absorbing equilibrium pressures at the plateau areas of the initial stage and during steady-state operation were checked and shown in Table 2.

TABLE 2

| Alloy | Composition I | II | Pressure Initial | Full |
|---|---|---|---|---|
| $b_5$ | $MmNi_{4.8}Mn_{0.2}$ | $MmNi_5$ | 9 | 4 |
| $b_6$ | $Ca_{0.7}Mm_{0.3}Ni_{4.8}Al_{0.2}$ | $MmNi_{4.8}Al_{0.2}$ | 7 | 1.5 |
| $b_7$ | $TiFe_{0.8}Mn_{0.2}$ | TiFe | 5 | 3.5 |
| $b_8$ | $Ti_{1.2}Cr_{1.2}Mn_{0.8}$ | TiCr | 8 | 5 |

(Unit: atm)

Alloys $b_6$ through $b_8$ have identical characteristics with Alloy $b_5$.

Embodiment 9 according to this invention

Alloy $b_1$ and another hydrogen absorbing alloy expressed with $MmNi_{4.5}Mn_{0.5}$, which has a lower equilibrium pressure than Alloy $b_1$ at an equal temperature, were mixed in a weight ratio of 80:20. The above hydrogen absorbing alloy mixture will be referred to as Alloy $b_9$.

Embodiment 10 according to this invention

Alloy $b_2$ and another hydrogen absorbing alloy expressed with $CaNi_5$, which has a lower equilibrium pressure than Alloy $b_2$ at an equal temperature, were mixed in a weight ratio of 80:20. The above hydrogen absorbing alloy mixture will be referred to as Alloy $b_{10}$.

Embodiment 11 according to this invention

Alloy $b_3$ and another hydrogen absorbing alloy expressed with $TiCo_{0.5}Mn_{0.5}$, which has a lower equilibrium pressure than Alloy $b_3$ at an equal temperature, were mixed in a weight ratio of 80:20. The above hydrogen absorbing alloy mixture will be referred to as Alloy $b_{11}$.

Embodiment 12 according to this invention

Alloy $b_4$ and another hydrogen absorbing alloy expressed with $Ti_{1.2}Cr_{1.2}Mn_{0.6}V_{0.2}$, which has a lower equilibrium pressure than Alloy $b_4$ at an equal temperature, were mixed in a weight ratio of 80:20. The above hydrogen absorbing alloy mixture will be referred to as Alloy $b_{12}$.

Experiment 5

Figure 16:
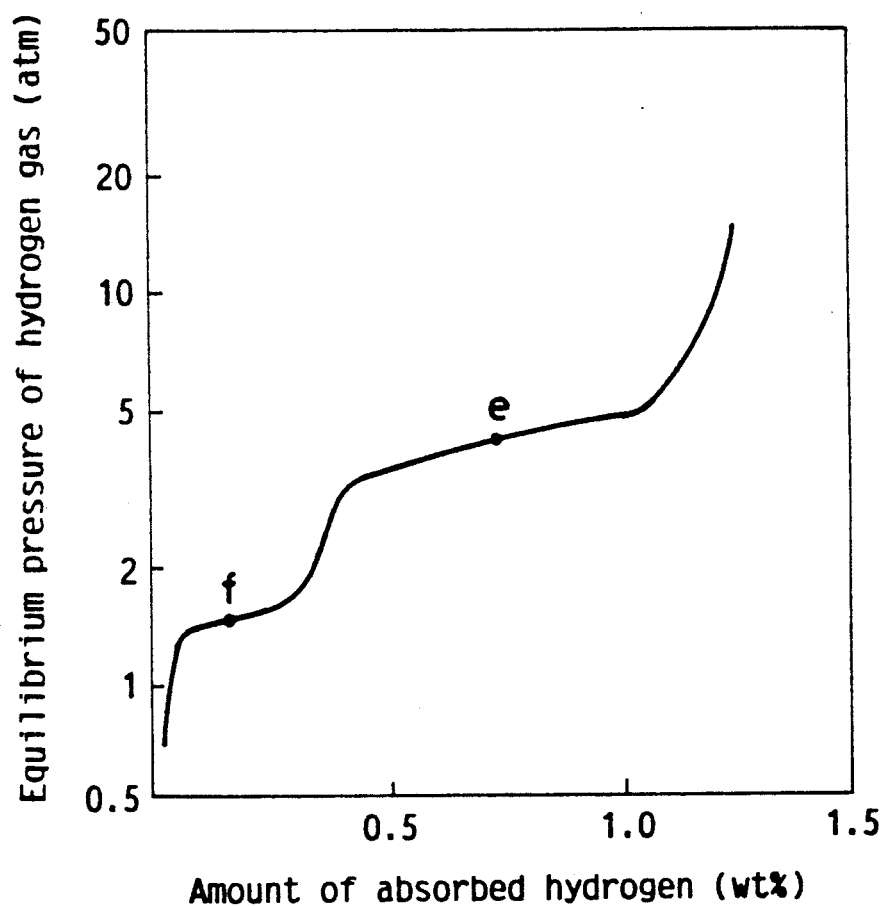
FIG. 16 is a graph showing a relationship between the equilibrium pressure and the amount of absorbed hydrogen gas absorbed by Alloy $b_9$ at 25° C.

Regarding Alloy $b_9$, a relationship between the equilibrium pressure and an amount of absorbed hydrogen gas at a room temperature (25°) was examined and shown in FIG. 16.

In FIG. 16, the equilibrium pressure is quite low in the plateau area (indicated with "f") at the final stage of the hydrogen gas supply. Accordingly, the decline in the amount of the remaining hydrogen gas is quickly checked.

In the plateau area of the steady-state operation (indicated with "e"), the hydrogen gas pressure is equal to that in the case of Alloy $b_1$. This means Alloy $b_9$ also has effects identical to those of Alloy $b_1$.

Experiment 6

Concerning Alloys $b_9$ through $b_{12}$, the hydrogen absorbing equilibrium pressures at the plateau areas of the initial stage and during steady-state operation were checked and shown in Table 3.

TABLE 3

| Alloy | Composition I | Composition II | Pressure Initial | Pressure Full |
|---|---|---|---|---|
| $b_9$ | $MmNi_{4.8}Mn_{0.2}$ | $MmNi_{4.5}Mn_{0.5}$ | 4 | 2 |
| $b_{10}$ | $Ca_{0.7}Mm_{0.3}Ni_{4.8}Al_{0.2}$ | $CaNi_5$ | 1.5 | 1 |
| $b_{11}$ | $TiFe_{0.8}Mn_{0.2}$ | $TiCo_{0.5}Mn_{0.5}$ | 3.5 | 1 |
| $b_{12}$ | $Ti_{1.2}Cr_{1.2}Mn_{0.8}$ | $Ti_{1.2}Cr_{1.2}Mn_{0.6}V_{0.2}$ | 5 | 3 |

(Unit: atm)

Alloys $b_{10}$ through $b_{12}$ have the characteristics identical to Alloy $b_9$.

Other points to note (1) The following hydrogen absorbing alloys can be employed in addition to the above.

a) $MgZn_2$-type alloy having a Laves-phase structure and including at least Zr and Mn. Or $AB_5$-type alloy having a hexagonal crystal structure and including at least a rare earth element (Y, La, Ce, Pr, Nd, Sm or compounds of these elements) and Ni, and at least one of a first transition metal element, Al and Sn.

b) $AB_5$-type alloy having a hexagonal crystal structure and including at least Ca and Ni and at least one of a first transition metal element, Al, Sn and a rare-earth element.

c) AB-type alloy having a cubic structure and including at least Ti, Fe or Co.

d) $Mg_2Cu$-type alloy having a Laves-phase structure and including at least Ti and Cr. Or $MgZn_2$-type alloy having a hexagonal crystal structure and including at least Ti and Cr.

e) $AB_2$-type alloy having a hexagonal crystal structure and including at least Mg and a first transition metal element.

(2) The grain diameter is not limited to 50 μm.

(3) If the main hydrogen absorbing alloy is added with another hydrogen absorbing alloy having a higher equilibrium pressure than the main alloy at an equal temperature and still another hydrogen absorbing alloy having a lower equilibrium pressure than the main alloy, the supply of the hydrogen gas at the initial stage thereof is further streamlined, and moreover, the appropriate time for supplying the hydrogen gas is easily checked.

Although the present invention has been fully described by way of embodiments with references to the accompanying drawings, it is to be noted that various changes and modifications will be apparent to those skilled in the art. Therefore, unless such changes and modifications depart from the scope of the present invention, they should be construed as being included therein.

What is claimed is:

1. A fuel cell system for directly converting a chemical energy of a fuel into an electric energy electrochemically, the system comprising:
   a fuel cell having a cathode and an anode;
   a main hydrogen absorbing alloy for supplying a hydrogen gas to the anode of said fuel cell during steady-state operation of the system; and
   an auxiliary hydrogen absorbing alloy originally having a higher hydrogen gas absorbing/desorbing equilibrium pressure than said main hydrogen absorbing alloy at an equal temperature, whereby, when supplying a hydrogen gas to the anode until the equilibrium pressure of said main hydrogen absorbing alloy becomes equal to a hydrogen gas absorbing/desorbing equilibrium pressure of said auxiliary hydrogen absorbing alloy, said auxiliary hydrogen absorbing alloy receives the hydrogen gas from said main hydrogen absorbing alloy during steady-state operation.

2. A fuel cell system of claim 1, wherein said fuel cell and said main hydrogen absorbing alloy are connected to each other through a hydrogen gas supply path, which is equipped with said auxiliary hydrogen absorbing alloy.

3. A fuel cell system of claim 1, wherein said fuel cell and said main hydrogen absorbing alloy are connected to each other through a hydrogen gas supply path, which has a branch path equipped with said auxiliary hydrogen absorbing alloy.

4. A fuel cell system of claim 2, wherein said auxiliary hydrogen absorbing alloy and said main hydrogen absorbing alloy are connected to each other through a hydrogen gas circulating path equipped with a back pressure valve;
   means for operating said back pressure valve at no lower than a predetermined pressure.

5. A fuel cell system of claim 3, wherein said auxiliary hydrogen absorbing alloy and said main hydrogen absorbing alloy are connected to each other through a hydrogen gas circulating path equipped with a back pressure valve;
   means for operating said back pressure valve at no lower than a predetermined pressure.

* * * * *